May 17, 1966  G. R. ASCHAUER  3,251,442
ONE-WAY AND FLUID OPERATED FRICTION CLUTCHES
Filed May 4, 1964  2 Sheets-Sheet 1
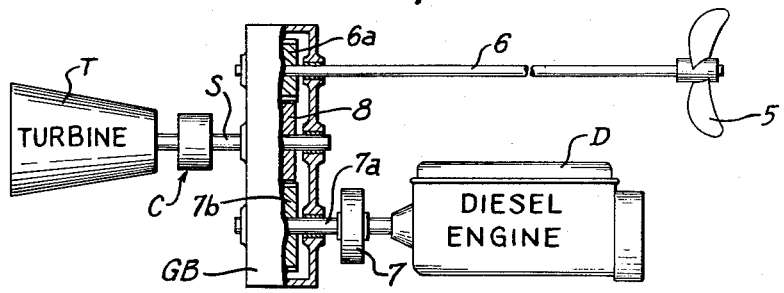
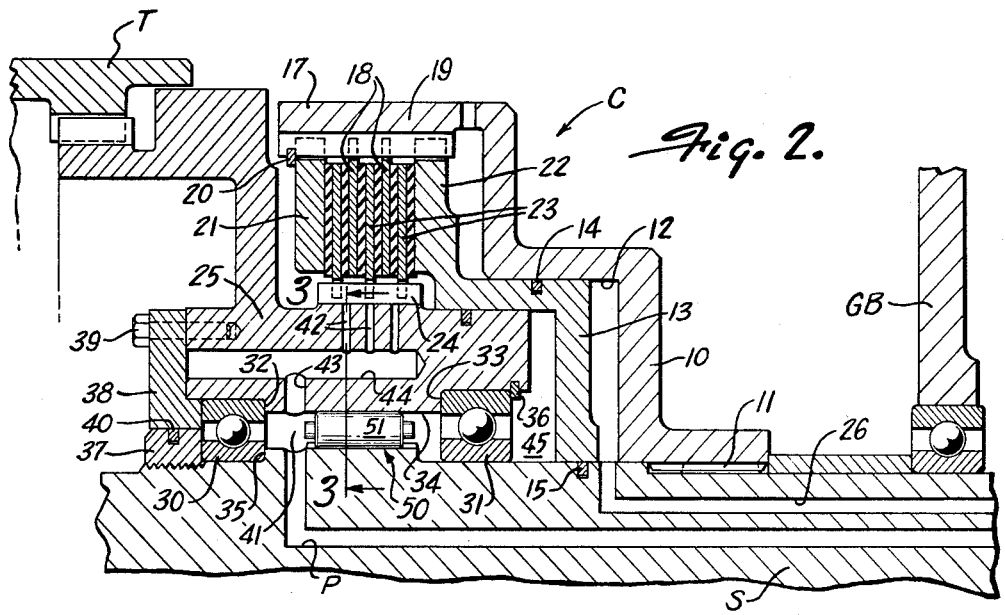
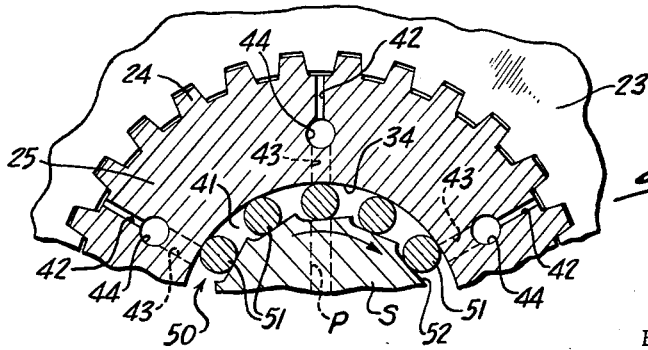
INVENTOR.
GEORGE R. ASCHAUER
BY
James E. Nilles
ATTORNEY

3,251,442
ONE-WAY AND FLUID OPERATED FRICTION CLUTCHES

George R. Aschauer, Racine, Wis., assignor to Twin Disc Clutch Company, Racine, Wis., a corporation of Wisconsin
Filed May 4, 1964, Ser. No. 364,433
5 Claims. (Cl. 192—48)

The present invention relates generally to clutches which combine both a friction clutch and a one-way clutch.

In accordance with the present invention, a combination clutch of the above type is provided which has a friction clutch for furnishing accelerating drive by means of the slippable friction plates and a positive drive engagement for the normal load through a one-way clutch. The two clutches are compactly and efficiently arranged in axial and concentric alignment and find particular utility as a clutch device for connecting, for example, multiple power sources together or to a single load.

A more specific aspect of the present invention relates to a compact combination clutch of the above type in which the friction clutch is hydraulically actuated, and in which the piston cylinder forms a housing which encloses both the friction and one-way clutches. A more specific aspect of the invention provides that the fluid which is used to disengage the hydraulic piston, is also utilized to lubricate the friction disc and lubricate the one-way clutch.

Another important aspect of the present invention relates to the combination of the above type of clutch with multiple power sources.

A more specific object of the invention is to provide a novel combination friction and one-way starter clutch.

These and other objects and advantages of the present invention will appear later as this disclosure progresses, reference being had to the accompanying drawings, in which:

FIGURE 1 is a schematic showing of a multiple power source connected to a load by means of the present invention;

FIGURE 2 is a fragmentary, enlarged and sectional view of the combination friction and one-way clutch C shown in FIGURE 1;

FIGURE 3 is a transverse cross sectional view taken on line 3—3 of FIGURE 2.

FIGURE 1

Figure 4:
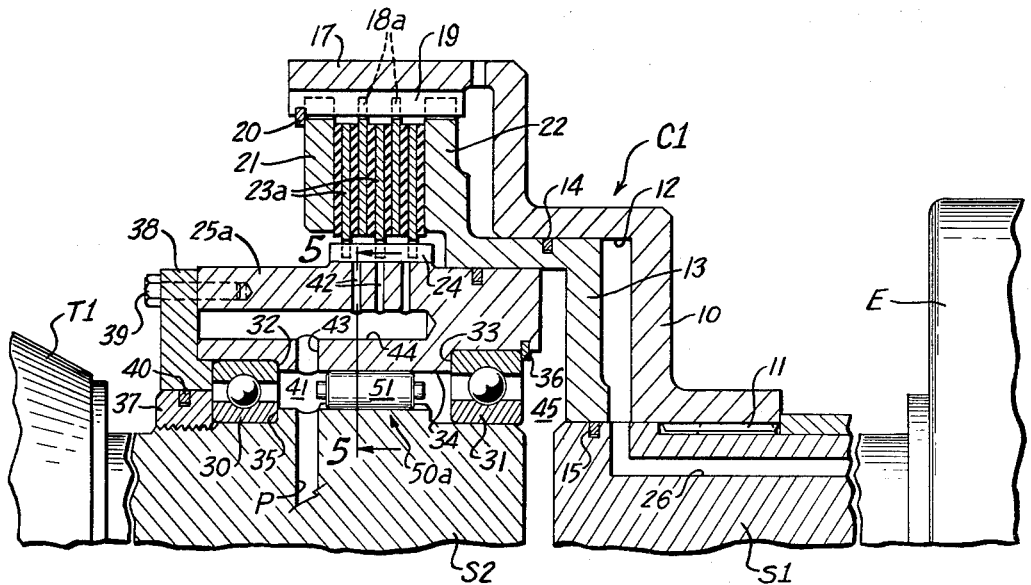
FIGURE 4 is a modified form of clutch made in accordance with the present invention.
Figure 5:
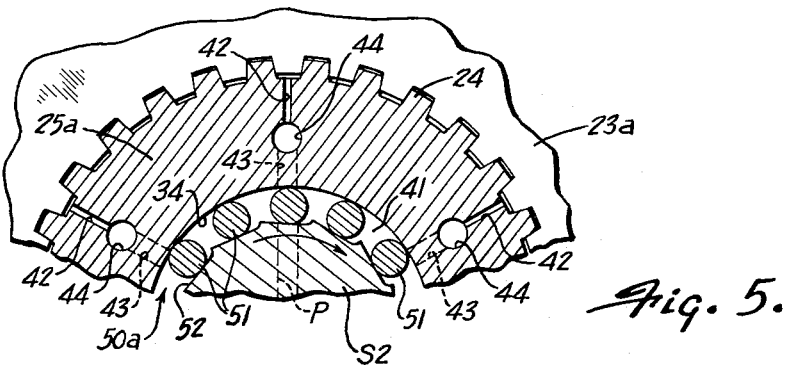
FIGURE 5 is a sectional view taken along 5—5 in FIGURE 4.

The present invention will first be described in connection with a starter for a gas turbine where it finds considerable utility; more particularly as a clutch for connecting a driven load, for example, the propeller of a marine landing craft, first to a diesel engine through a separate friction clutch C and until the operating speed of a gas turbine is attained, and then to the gas turbine through the combination friction and one-way clutch, during the entire period of which torque and a constant drive is provided to the load.

Referring in greater detail to FIGURE 1 of the drawings, a driven load in the form of a propeller 5 for a water craft (not shown) is connected to a conventional gear box GB. The propeller is mounted on shaft 6 which may have gears, such as gear 6a, fixed thereto. A power plant in the form of a conventional diesel engine D is connected to the gear box through a conventional friction clutch 7 on its shaft 7a, and a gear 7b fixed thereon which meshes with a gear 8 fixed on shaft S. It will be understood that shafts S, 7a and 6 are all suitably journalled in the gear box and may have other gears which are selectively engageable to effect speed change ratios, to thus drive the gear box and propeller. A power plant in the form of a gas turbine T is also connected to a drive shaft S by the combination friction and one-way clutch C of the present invention.

The clutch housing 10 forms a first rotatable member which is connected to the shaft S by the spline connection 11 and forms a hydraulic cylinder 12 around and concentric with shaft S. A friction clutch actuating piston 13 reciprocates in the cylinder and has conventional fluid seals 14 and 15.

The housing also forms a clutch drum 17 in which the clutch plates 18 are mounted in the conventional manner for limited axial movement on the internal splines 19 formed in the drum. A snap ring 20 holds the back up member 21 against which the pressure member 22 of the piston compresses the plates 18 which are conventionally interleaved with the clutch plates 23 that are axially slidable on spline 24 of a rotatable intermediate member 25.

Pressure fluid from passage 26 in shaft S enters cylinder or chamber 12, forcing the piston to the left, as viewed in the drawings, to actuate or engage the friction clutch so that shaft S drives the turbine. In this manner, the diesel engine drives not only the propeller, but also the turbine.

The rotatable intermediate member 25 of the clutch is rotatably mounted on shaft S by the pair of conventional axially spaced anti-friction, ball bearing assemblies 30 and 31 which are located between shoulders 32 and 33 formed on the internal cylindrical surfaces 34 of member 25, and shoulder 35 on shaft S. Member 25 is held captive in assembled relationship by a snap ring 36 and also by a lock nut 37 on shaft S. An end cap 38 is held on member 25 by cap bolts 39 threaded into it and a fluid seal 40 is located between the lock nut 37 and end cap 38.

A fluid passage P in shaft S provides lubricating fluid, at relatively low pressure, through the annular space 41 between member 25 and shaft S, and to a series of small, radial holes 42, via passages 43 and 44 which are drilled in rotatable member 25. These radial holes extend into the spline connection (FIGURES 2 and 3) to thereby furnish lubricating fluid between the interleaved clutch plates. This fluid also lubricates bearing assemblies 30 and 31, and through assembly 31 enters the space 45 on the side of piston 13. This admission of lubricating fluid thus causes the plates to tend to separate, thereby positively disengaging the friction clutch when the fluid in chamber 12 is not pressurized.

A one-way clutch is formed between member 25 and shaft S and includes a series of circumferentially spaced rollers 51 located between the internal cylindrical surface 34 of member 25 and the one-way roller cam surfaces 52. The hydraulic fluid also lubricates this one-way clutch.

When the shaft S rotates in the direction indicated by the curvilinear arrow in FIGURE 3, it drives the turbine T, which constitutes a second rotatable member, through the friction clutch at a speed which is slower than the operational speed of the turbine. As the shaft S thus drives the propeller, the turbine is simply driven by the shaft S, and the one-way clutch simply overruns and does not drive as the rollers 51 are not riding radially outward on their cam surfaces 52.

However, when the speed of the shaft S and the friction clutch is sufficient to bring the turbine up to its operational speed, then the turbine "fires in" or takes over the drive to the propeller through shaft S, through the one-way clutch. In other words, the member 25 is driven faster than shaft S and the rollers 51 ride radially outwardly on their cam surfaces 52 to effect drive engagement through the one-way clutch.

After the turbine has taken over the drive of the propeller through shaft S, the conventional friction clutch 7 is disengaged either normally or automatically to prevent overspeeding of the diesel. The clutch C of the present invention is then also disengaged as described earlier.

With the above arrangement, the dead turbine is accelerated by means of the friction clutch which brings the turbine up to its firing speed, and the driving shaft then runs away from the released one-way clutch. In other words, the one-way clutch engages as the turbine fires and over-runs the driven shaft S, the power then flows from the turbine back through the engaged one-way clutch to the load.

FIGURE 4 MODIFICATION

In this modification, parts similar to those in the FIGURE 1 device have been similarly numbered, or a modified form designated with a suffix numeral or letter. The invention is shown and described as used in a starter drive, i.e., as a gas turbine starter clutch, where it finds particular but not exclusive utility. For example, assume a power plant such as starter engine E has by means of the friction clutch C1, brought the speed of the driven shaft S2, which constitutes a second rotatable member, up to a speed of 8000 r.p.m. which is the firing speed of another power plant such as gas turbine T1. That is, the friction clutch has been engaged and power flows through the plates 18a and 23a and inwardly through the intermediate member 25a and the engaged one-way clutch 50a and turbine shaft S2 to the turbine T1. After the gas turbine is operating, it increases speed, to say 20,000 r.p.m., the turbine shaft S2 over-runs the one-way clutch, and the starter motor stops.

Thus with this modification, the dead turbine is accelerated by means of the friction clutch, as in the FIGURE 1 device, but here it is also through and by means of the engaged one-way clutch. After the turbine has been driven to its firing speed and then "fires in" and over runs the one-way clutch 50a, the latter releases and allows the friction clutch to come to rest. Here the one-way clutch does the sliding and the clutch plates 18a and 23a are prevented from any high sliding velocities which would generate heat and waste power.

The FIGURE 4 modification provides a starter clutch in which only a relatively light torque is carried through the one-way clutch to accelerate the turbine, and the friction clutch need not carry any relatively heavy load.

Various modes of carrying out the invention are contemplated as being within the scope of the following claims particularly pointing out and distinctly claiming the subject matter which is regarded as the invention.

I claim:

1. A compact and integral combination friction and one-way clutch comprising; a first rotatable member including a cylindrical housing, a piston slidable in said housing to define a fluid pressurizable chamber; a second rotatable member rotatably mounted in axial alignment with and adjacent to said first member; friction clutch means between said members for providing rotational drive in one direction from the first to the second member, said piston engageable with said friction clutch means to cause positive engagement thereof when said chamber is pressurized, one-way clutch means between said members for permitting said second member to drive independently when its speed rises above that of said first member, said one-way clutch means being aligned radially with said friction clutch means, and said housing extending radially of and surrounding both said clutch means, and an intermediate member mounted on anti-friction bearing assemblies and located between said friction and one-way clutch means.

2. In combination with a first power plant and a second power plant; a compact and integral combination friction and one-way clutch comprising, a first rotatable member including a cylindrical housing driven by said first power plant, a second rotatable member connectable to said second power plant for furnishing drive to the latter and concentrically and rotatably mounted adjacent said first member, friction clutch means between said members for providing rotational drive in one direction from said first member to said second member, a piston slidable within said housing to define a pressurizable chamber therewith, said piston engageable with said friction clutch means when said chamber is pressurized for causing engagement of said friction clutch means, one-way clutch means between said members and arranged in substantial radial alignment with said friction clutch means, said housing surrounding both said clutch means, said first power plant driving said second power plant through said friction clutch means until said second power plant is brought up to its operating speed after which said second power plant runs independently of the first power plant.

3. A combination friction and one-way clutch comprising, a first rotatable member including a cylindrical housing, a second rotatable member concentrically and rotatably mounted in respect to said first member, one-way clutch means between said members whereby said second member drives said first member in one rotational direction only, friction clutch means between said members for providing a drive therebetween, said one-way and friction clutch means being arranged in substantial radial alignment with one another, a piston slideable in said housing to form a pressurizable chamber therewith, said piston engageable with said friction clutch means when said chamber is pressurized for causing engagement of said friction clutch means, said housing surrounding and enclosing both said clutch means.

4. A compact and integral combination friction and one-way clutch comprising, a first rotatable member including a cylindrical housing, a second rotatable member rotatably mounted adjacent in respect to said first member and in axial alignment therewith, and one-way clutch means between said members whereby said second member can overrun said first member in said one rotational direction, after it reaches a predetermined speed above the speed of said first member, friction clutch means between said members for providing rotational drive in one direction from said first member to said second member, a piston slideable in said housing to form an expansible chamber and engageable with said friction clutch means when said chamber is pressurized for causing engagement of said friction clutch means, said housing surrounding and enclosing both said clutch means, said one-way and friction clutch means being arranged in substantial radial alignment, and an intermediate member mounted on anti-friction bearing assemblies and located between said friction and one-way clutch means.

5. In combination with a first power plant and a second power plant, a combination friction and one-way clutch comprising, a first rotatable member including a cylindrical housing and piston slideable therein and defining a pressurizable chamber therewith, said member driven by said first power plant, a second rotatable member rotatably mounted in axial alignment with and adjacent to said first member and connected to said second power plant for initially transmitting driving power to said second power plant, an intermediate member rotatably mounted between said first and second members, radially aligned one-way clutch means and friction clutch means connected to said members for providing a drive from said first power plant to said second power plant, said piston engageable with said friction clutch means when said chamber is pressurized to cause engagement of said friction clutch means, whereby said second power plant is brought up to its operating speed, and said second power plant then drives independently of said first power plant by overrunning said one-way clutch, said housing extending radially beyond and surrounding and enclosing both of said clutches.

References Cited by the Examiner

UNITED STATES PATENTS

| | | | |
|---|---|---|---|
| 1,186,745 | 6/1916 | Callaway | 192—48 X |
| 1,466,394 | 8/1923 | Fornaca | 192—48 X |
| 2,482,460 | 9/1949 | Browne | 192—48 X |
| 2,792,714 | 5/1957 | Forster | 192—48 X |
| 2,842,004 | 7/1958 | Lammerz et al. | 192—48 X |
| 3,166,165 | 1/1965 | Anderson et al. | 192—48 X |

DAVID J. WILLIAMOWSKY, *Primary Examiner.*

DON A. WAITE, *Examiner.*

B. W. WYCHE III, *Assistant Examiner.*